United States Patent [19]
Cirkel et al.

[11] Patent Number: 4,887,275
[45] Date of Patent: Dec. 12, 1989

[54] HIGH-ENERGY LASER SYSTEM

[75] Inventors: Hans-Jürgen Cirkel; Willi Bette; Reinhard Müller, all of Erlangen, Fed. Rep. of Germany

[73] Assignee: Kraftwerk Union Aktiengesellschaft, Mülheim/Ruhr, Fed. Rep. of Germany

[21] Appl. No.: 837,564

[22] Filed: Mar. 3, 1986

Related U.S. Application Data

[63] Continuation of Ser. No. 484,621, Apr. 13, 1983.

[30] Foreign Application Priority Data

Apr. 19, 1982 [DE] Fed. Rep. of Germany ....... 3214480
Aug. 30, 1982 [DE] Fed. Rep. of Germany ....... 3232225

[51] Int. Cl.$^4$ .............................................. H01S 3/097
[52] U.S. Cl. .......................................... 372/83; 372/38
[58] Field of Search ........................................... 372/38

[56] References Cited

U.S. PATENT DOCUMENTS 3,815,047  6/1974  Smith et al. ............................ 372/83
4,130,809 12/1978  Hasson et al. ......................... 372/83

Primary Examiner—Robert E. Wise
Attorney, Agent, or Firm—Herbert L. Lerner; Laurence A. Greenberg

[57] ABSTRACT

A high-energy TE laser system, includes an excitation circuit, a laser head having an optical axis, a laser chamber with a gas space formed therein, at least two laser electrodes being disposed opposite each other and spaced apart in the laser chamber parallel to the optical axis of the laser head for producing an arc-free capacitor discharge between the electrodes being as homogenous as possible in the gas space for excitation, at least one rapid high-voltage switch, a pulse-forming network connected to the rapid high-voltage switch for producing high-voltage pulses at the laser electrodes with the rapid high-voltage switch, the pulse-forming network including first and second strip conductor capacitors respectively associated with the rapid high-voltage switch and with the laser head, the strip conductor capacitors including plates and dielectric layers disposed between the plates extended substantially normal to the optical axis of the laser head, forming a capacitor stack stacked substantially parallel to the optical axis of the laser head, the plates being connected in the pulse-forming network, the pulse-forming network being a Blümlein circuit in which at least one plate of the second strip conductor capacitor is connected to one of the laser electrodes, and the plates being divided into n adjacent plate sections having n−1 partings respectively disposed therebetween, and coupling inductances conductively connecting the plate sections to each other. Otherwise, the pulse-forming network is a charge-transfer circuit in which at least a partial surface of the plates of the first and second strip conductor capacitors are connected in common to one of the laser electrodes.

36 Claims, 2 Drawing Sheets

HIGH-ENERGY LASER SYSTEM

This application is a continuation of application Ser. No. 484,621, filed Apr. 13, 1983.

The invention relates to a high-energy TE laser system for matching pulse-forming or shaping networks to the requirements of the excitation circuit of the system, comprising an excitation circuit, a laser head having an optical axis, a laser chamber with a gas space formed therein, at least two laser electrodes being disposed opposite each other and spaced apart in the laser chamber parallel to the optical axis of the laser head and preferably having a solid section elongated parallel to the optical axis for producing an arc-free capacitor discharge between the electrodes being as homogeneous as possible in the gas space for excitation, at least one rapid high-voltage switch, a pulse-forming network connected to the rapid high-voltage switch for producing, activating or firing high-voltage pulses at the laser electrodes with the rapid high-voltage switch, the pulse-forming network including first and second strip conductor capacitors respectively associated with the rapid high-voltage switch and with the laser head, the strip conductor capacitors including plates, coatings, or electrodes and dielectric layers disposed between the plates extended substantially normal to the optical axis of the laser head, forming a capacitor stack stacked substantially parallel to the optical axis of the laser head, the plates being connected in the pulse-forming network directly or through laterally-projecting connecting lugs.

A high-energy TE laser system of the above-described type is known from German Published, Non-Prosecuted Application DE-OS 29 32 781, corresponding to U.S. Pat. No. 4,365,337. Suitable pre-ionization devices therefor are described particularly in German Published, Non-Prosecuted Applications DE-OS 30 35 730 and DE-OS 30 35 702, the former corresponding to U.S. application Ser. No. 303,167 now abandoned, filed Sept. 17, 1981. Here as in the following it is possible for high-energy TE laser systems as described above to be equipped with such preionization devices; a description of such devices is therefore unnecessary within the scope of the present application, which is concerned with finding a favorable structure for the pulse-forming network, and determining the circuit elements within the excitation circuit, wherein the excitation circuit is to be understood as including the pulse-shaping network with its rapid high-voltage switch, as well as the laser head.

High-energy TE lasers (TE=transversely excited) are required in cost-effective structures and with a high average radiation or light output for photomechanical applications, particularly in the industrial area.

Wave resistances of the pulse-forming network which are as low as possible, with sufficiently high current build-up speeds, are favorable for the operation of these lasers. This can be achieved with a suitable combination of the inductances of the excitation circuit with the capacitances of the pulse-forming network. In addition to the foregoing, with many applications of these TE lasers it is desirable to obtain a laser pulse which is as long as possible. These requirements would be fulfilled most advantageously with a square-wave pulse as an excitation pulse, i.e. a current pulse with a steep leading edge, as wide and flat as possible a top, and a steep falling slope.

It is a general object of the invention to provide a high energy laser system having pulse generating or pulse forming capabilities that meet the above-mentioned requirements as close or as good as possible.

A high energy TE laser system comprising a sheet form conductor type capacitor for energy storage has already been proposed according to the German Published, Non-Prosecuted Application DE-OS 3 128 206, corresponding to U.S. application Ser. No. 396,651, filed Jul. 9, 1982, now U.S. Pat. No. 4,521,889, which describes an embodiment wherein the conductive layers of the sheet form conductor capacitor being connected to the high voltage (first) electrode of the laser chamber, respectively, are provided with notches or slots, said notches or slots multiplying or increasing the length of the current path along the conductive layers for the discharge current. This embodiment, however, has its limitations in regard to stretching or extending the pulse duration, to overcome these limitations is a special object of the present invention.

It is another special object of the invention to provide a high-energy TE laser system which provides a simpler and more cost-effective production of the conductive layer sections of the sheet form conductor capacitor and of the capacitor plate sections in the case of a sheet form conductor capacitor with a fluid dielectric, particularly water.

With the foregoing and other objects in view there is provided, in accordance with the invention, a high-energy TE laser system for matching pulse-forming or shaping networks to the requirements of the excitation circuit of the system, comprising an excitation circuit, a laser head having an optical axis, a laser chamber with a gas space formed therein, at least two electrodes being disposed opposite each other and spaced apart in the laser chamber parallel to the optical axis of the laser head and preferably having a solid section elongated parallel to the optical axis, for producing an arc-free capacitor discharge between the electrodes being as homogeneous as possible in the gas space for excitation, at least one rapid high-voltage switch, a pulse-forming network connected to the rapid high-voltage switch for producing, activating or firing high-voltage pulses at the laser electrodes with the rapid high-voltage switch, the pulse-forming network including first and second strip conductor capacitors respectively associated with the rapid high-voltage switch and with the laser head, the strip conductor capacitors including plates, coatings, or electrodes and dielectric layers disposed between the plates extended substantially normal to the optical axis of the laser head, forming a capacitor stack stacked substantially parallel to the optical axis of the laser head, the plates being connected in the pulse-forming network directly or through laterally-projecting connecting lugs, the pulse-forming network being a Blümlein circuit in which at least one plate of the second strip conductor capacitor is connected to one of the laser electrodes, and the plates being divided into n adjacent plate sections having n−1 partings respectively disposed therebetween, and coupling inductances conductively connecting the plate sections to each other.

In accordance with another feature of the invention, the pulse-forming network is a charge-transfer circuit in which at least a partial surface of the plates of the first and second strip conductor capacitors are connected in common to one of the laser electrodes and said plates being divided into n adjacent plate sections having n−1 partings disposed therebetween, and coupling inductances conductively connecting said plate sections to each other.

In accordance with a further feature of the invention, the plate or coating sections have rectangular surfaces forming a rectangular capacitor stack. Here and hereinbelow the expressions "sheet form conductor", "strip conductor", "conducting layer" "conductive coating", or "plate sections" are regarded as proper translations of the German expression "Kondensatos-Beläge", wherein "plate sections" is preferably proper in case of a water capacitor.

In accordance with an added feature of the invention, the coupling inductances are in the form of small coils.

In accordance with an additional feature of the invention, the coupling inductances are in the form of small filaments.

In accordance with again another feature of the invention, the plate or coating sections have edges bordering on the partings and the coupling inductances are attached to the plate or coating sections at discrete points distributed along the bordering edges of the plate or coating sections.

In accordance with again a further feature of the invention, the coupling inductances are intermetallically connected to the plate or coating sections by soft soldering, hard soldering or brazing or by welding.

In accordance with again an added feature of the invention, the coupling inductances are mechanically connected to the plate or coating sections by plugging, clamping or screwing or by wire wrapping.

In accordance with again an additional feature of the invention, the coating sections are all of substantially equal size and the partings are all of substantially equal size.

In accordance with a concomitant feature of the invention, at least some of the coating sections have different size surfaces or at least some of the partings have different widths or at least some of the coupling inductances have different L and R values.

Other features which are considered as characteristic for the invention are set forth in the appended claims.

Although the invention is illustrated and described herein as embodied in a high-energy TE laser system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
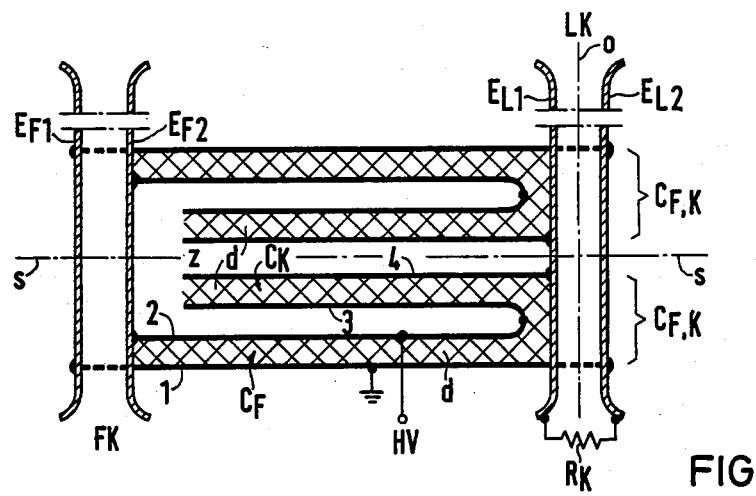
FIG. 2 is a diagrammatic, cross-sectional view of an associated spatial construction of a strip conductor capacitor stack with a laser chamber and a rapid high-voltage switch on two respective outer sides of the stack.
Figure 4:
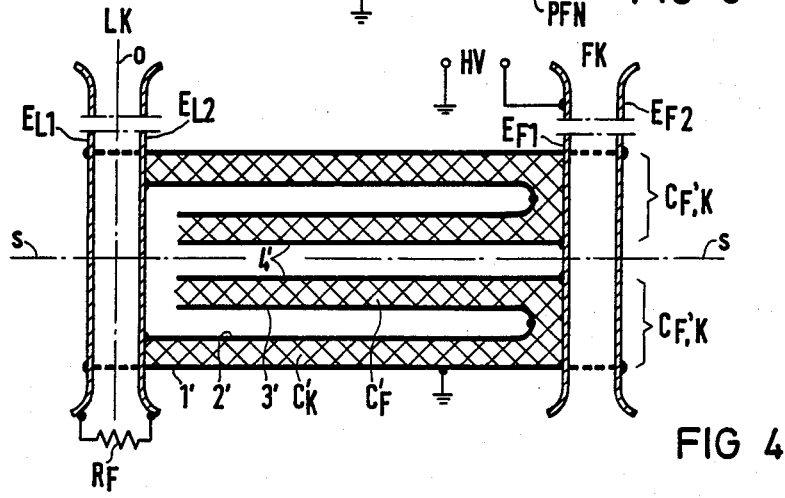
Figure 5:
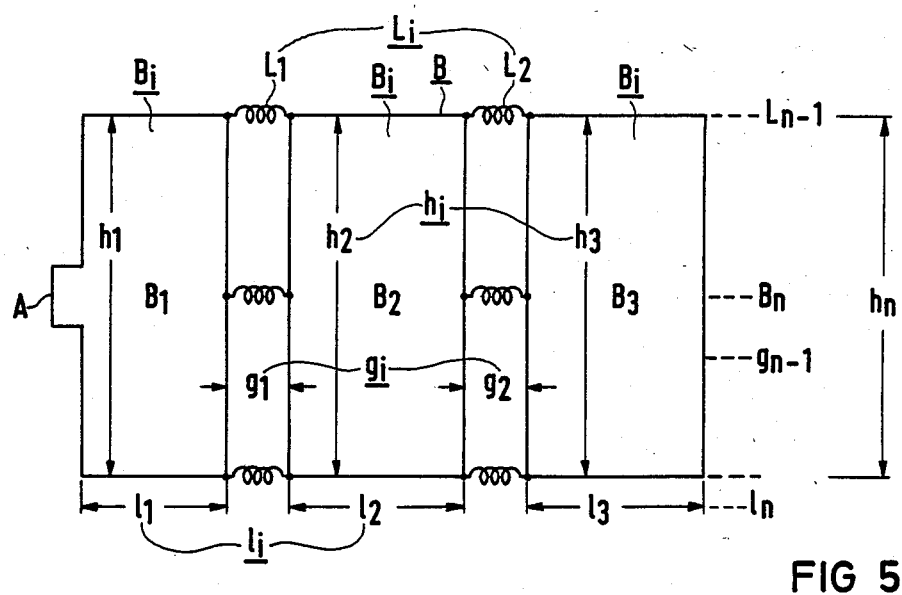

FIG. 4 is a cross-sectional view of an associated spatial construction of a strip conductor capacitor stack with a laser chamber and a rapid high-voltage switch on two respective outer longitudinal sides, in accordance with the view of FIG. 2; and FIG. 5 is a diagrammatic top plan view and a schematic circuit diagram of a capacitor plate, electrode or coating having joints or partings and coupling inductances between the coating sections, thereby forming a delay line.

Referring now to the figures of the drawing and first particularly to FIG. 5 thereof, there is seen a capacitor plate, electrode or coating B divided into three rectangular, or substantially rectangular, plate, electrode or coating sections $B_1$, $B_2$ and $B_3$ by partings or joints $g_1$, $g_2$ disposed between the sections. Adjacent plate, electrode or coating sections are conductively connected to each other in each case by coupling inductances $L_1$ (parting $g_1$) and $L_2$ (parting $g_2$). The heights of the coating sections $B_i$ are indicated in common by reference symbol $h_i$ and specifically by reference symbols $h_1$, $h_2$ and $h_3$ for the coating sections with the same numbering; the lengths of the coatings sections $B_i$ are indicated in common by reference symbol $l_i$ and specifically by reference symbols $l_1$, $l_2$ and $l_3$. According in each case to the length of the electrode, plate, or coating B, or of the delay-network chain made up of the individual coating sections $B_i$, there can be provided $n_n$ coating sections, $n-1$ associated coupling inductances and $n-1$ associated partings with corresponding height dimensions $h_n$ and length dimensions $l_n$ for a rectangular surface, where $n \geq 2$.

The coupling inductances $L_i$ are, as shown, in the form of small coils, the size of which depends on the desired pulse delay; they can also take the form of small filaments.

According to FIG. 5, the coupling inductances $L_i$ are disposed at and connected in each case to three separate points on the boundary edges of the electrode or coating sections $B_i$ to bridge each parting at the upper edge, at the lower edge and at the center region. It is, however, also possible to place and connect the coils, from parting to parting, alternately at the upper and lower edges, thus producing a strong meandering current path along the length of the whole electrode or coating, or the central connecting coils might be retained in each case, while only the outer connecting coils alternate, which would produce a less strong meandering current path. The coupling inductances are advantageously connected intermetallically to their associated plate, electrode or coating sections $B_i$ by soft soldering, by hard soldering or brazing, or by welding. In principle, clamp, plug, or screw connections or wire-wrap connections, as well as mechanical terminal connections, are possible. It can be seen from FIG. 5 that the surfaces of the plate, electrode or coating sections $B_i$ and the partings or joints $g_i$ are all of substantially the same size. However, in adapting to the desired pulse shape and pulse delay, it is also possible to impart at least partly differing forms to the surfaces of the plate, electrode or coating sections $B_i$ and/or to the widths of the partings $g_i$ and/or to the LR values of the coupling inductances $L_i$.

Figure 1:
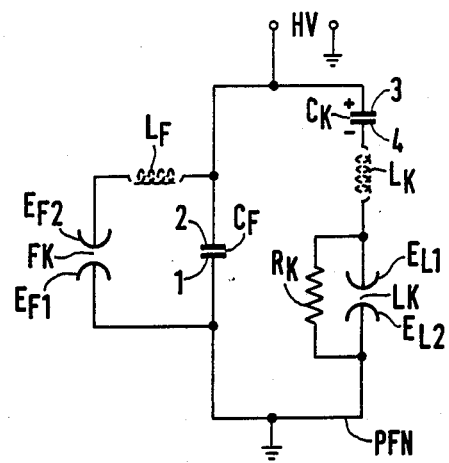
FIG. 1 is a schematic circuit diagram of a laser exciter circuit in Blümlein circuitry.

Reference symbol A indicates a terminal clip or lug for attaching the electrode, plate, or coating B to a laser electrode, or respectively to an electrode of a high-voltage switch FK, shown in FIGS. 1, 2 and 4.

The division of the electrode, plate, or coating B according to FIG. 5 can be used in the case of the pulse-forming network PFN in Blümlein circuitry according to FIG. 1 and FIG. 2, for a plate, electrode, or coating 4 of a second strip conductor capacitor $C_K$, or in addition for the plate, electrode, or coating 4 and the plates, electrodes, or coatings 2 and 3, of first and second strip conductor capacitors $C_F$ and $C_K$.

Figure 3:
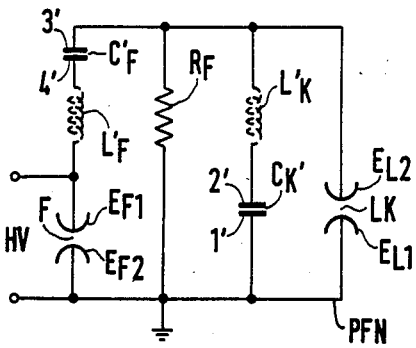
FIG. 3 is a circuit diagram of an exciter circuit in charge-transfer circuitry.

In the case of a pulse-forming network PFN in charge-transfer circuitry according to FIGS. 3 and 4, the structure of the plate, electrode or coating B according to FIG. 5 can be used at least for a joint surface of the electrodes or coatings 2', 3' of the first and second strip conductor capacitors $C'_F$, $C'_K$ connected together to one laser electrode $E_{L2}$, and according to a further embodiment in addition, not only for the plates, electrodes or coatings 2', 3' but also for the plate, electrode or coating 4' of the first strip conductor capacitor $C'_F$.

FIG. 1 and FIG. 2 show a known laser excitation circuit with a pulse-forming network PFN, as shown in FIG. 1 and FIG. 2 of German Published, Non-Prosecuted Application DE-OS 29 32 781, corresponding to U.S. Pat. No. 4,365,337, wherein equivalent inductances $L_F$ and $L_K$ are drawn with broken lines as in the present application. In particular, the equivalent inductances are the self-inductances of the high-voltage switch FK, of the laser head LK, of the supply lines and of the strip conductor capacitors $C_F$ and $C_K$.

Similarly, the known laser excitation circuit with its pulse-forming network PFN is shown in FIG. 3 and FIG. 4 in charge-transfer circuitry, as seen in FIG. 4 and FIG. 5 of DE-OS 29 32 781. In FIGS. 3 and 4 in the present application the equivalent inductances $L'_F$ and $L'_K$ are again shown in broken lines. In FIGS. 1 to 4, reference symbol LK indicates a laser head, or a laser chamber with at least two oppositely-disposed, spaced-apart electrodes $E_{L1}$, $E_{L2}$ between which an arc-free capacitor discharge which is as homogeneous as possible is excited in the gas space of the laser chamber LK by the high-voltage pulses produced by the pulse-forming network PFN. FK is the already-mentioned rapid high-voltage switch, which can be a spark chamber with the electrodes $E_{F1}$ and $E_{F2}$ or can also take the form of a configuration of Thyratrons or plasma switches. $R_K$ signifies an impedance connected in parallel with the laser discharge path or section, which is highly resistive compared to the internal resistance of the laser. HV signifies the high-voltage, and s is a plane of symmetry within the capacitor stack, which is formed of the capacitance units $C_F$, $C_K$. The illustrated mirror-inverted configuration of the capacitance units can also be replaced by an asymmetrical one. Reference symbol d indicates the solid, fluid or gaseous insulating material for the dielectric, emphasized by cross-hatching, and reference symbol O indicates the optical axis of the laser chamber LK.

In FIGS. 3 and 4, the reference symbols for the strip conductor capacitors, their plates, electrodes or coatings and the equivalent inductances are in each case provided with a prime but otherwise they have been given the same reference symbols as in FIGS. 1 and 2. FIGS. 1 to 4 only show examples of the pulse-forming network PFN; naturally, this can also be provided in a modified form, using an "elongated" structure or with a fluid dielectric, particularly chemically pure water. The equivalent inductances $L'_F$, $L'_K$ or $L'_F$, $L'_K$, respectively, must be taken into account in constructing the coupling inductances $L_i$. As seen in FIG. 3, the impedance, which is highly resistive compared to the laser discharge section and which is connected in parallel with $C'_K$ and with the series connection $L'_K - L'_K$, is indicated here by reference symbol $R_F$.

The foregoing is a description corresponding to German Application P 32 14 480.6, filed Apr. 19, 1982 and P 32 32 225.9, filed Aug. 30, 1982, the International priority of which is being claimed for the instant application and which is hereby made part of this application. Any discrepancies between the foregoing specification and the second mentioned corresponding German application are to be resolved in favor of the latter.

We claim:

1. High-energy TE laser system, comprising a laser head having an optical axis, a laser chamber with a gas space formed therein, at least two laser electrodes being disposed opposite each other and spaced apart in said laser chamber parallel to the optical axis of said laser head for producing a highly homogeneous arc-free capacitor discharge between said electrodes in said gas space for excitation, at least one rapid high-voltage switch, a pulse-forming network connected to said rapid high-voltage switch for producing high-voltage pulses at said laser electrodes with said rapid high-voltage switch, the pulses exciting the capacitor discharge, said pulse-forming network including first and second strip conductor capacitors respectively associated with said rapid high-voltage switch and with said laser head, said strip conductor capacitors including plates and dielectric layers disposed between said plates extended substantially normal to the optical axis of said laser head, forming a capacitor stack stacked substantially parallel to the optical axis of said laser head, said plates being connected in said pulse-forming network, said pulse-forming network being a Blümlein circuit in which at least one plate of said second strip conductor capacitor is connected to one of said laser electrodes, and said plates being divided into n adjacent plates sections having n−1 partings respectively disposed therebetween, and coupling inductances conductively connecting said plate sections to each other.

2. High-energy TE laser system, comprising a laser head having an optical axis, a laser chamber with a gas space formed therein, at least two laser electrodes being disposed opposite each other and spaced apart in said laser chamber parallel to the optical axis of said laser head for producing a highly homogeneous arc-free capacitor discharge between said electrodes in said gas space for excitation, at least one rapid high-voltage switch, a pulse-forming network connected to said rapid high-voltage switch for producing high-voltage pulses at said laser electrodes with said rapid high-voltage switch, the pulses exciting the capacitor discharge, said pulse-forming network including first and second strip conductor capacitors respectively associated with said rapid high-voltage switch and with said laser head, said strip conductor capacitors including plates and dielectric layers disposed between said plates extended substantially normal to the optical axis of said laser head, forming a capacitor stack stacked substantially parallel to the optical axis of said laser head, said plates being connected in said pulse-forming network, said pulse-forming network being a charge-transfer circuit in which at least a partial surface of said plates of said first and second strip conductor capacitors are connected in common to one of said laser electrodes, and said plates being divided into n adjacent plate sections having n−1 partings disposed therebetween, and coupling inductances conductively connecting said plate sections to each other.

3. TE-laser comprising: a laser chamber containing a lasing medium and at least two parallel, spaced apart, laser electrodes defining an optical axis therebetween and parallel therewith; a rapid high-voltage switch connected to a high-voltage source; a pulse-shaping network connected between the switch and the laser electrodes, the network including at least a first and second capacitor respectively operatively associated with said switch and with said laser electrodes, each capacitor having at least a first plate being disposed in a plane substantially perpendicular to the optical axis, forming a stack, said first plate of each capacitor being spaced apart from the other in direction of the optical axis; said first plate of each capacitor being connected to the other at adjoining edges; coupling inductances included in the equivalent inductances of the plates of the capacitors; said capacitors and coupling inductances together forming the pulse shaping network for transmitting a shaped high-voltage pulse created by said rapid high-voltage switch to said laser electrodes for producing an arc-free laser discharge therein.

4. TE-laser according to claim 3, wherein said pulse-forming network is of the Blümlein type in which at least one plate of said second capacitor is connected to one of said laser electrodes, and wherein said one capacitor plate is divided into n adjacent plate sections having n−1 partings respectively disposed therebetween, said coupling inductances conductively connecting said plate sections to each other.

5. Laser system according to claim 4, wherein said plate sections have rectangular surfaces forming a rectangular capacitor stack.

6. Laser system according to claim 4, wherein said coupling inductances are in the form of small coils.

7. Laser system according to claim 4, wherein said coupling inductances are in the form of small filaments.

8. Laser system according to claim 4, wherein said plate sections have edges bordering on said partings and said coupling inductances are attached to said plate sections at discrete points distributed along said bordering edges of said plate sections.

9. Laser system according to claim 4, wherein said coupling inductances are intermetallically connected to said plate sections by soldering or brazing.

10. Laser system according to claim 4, wherein said coupling inductances are intermetallically connected to said plate sections by welding 11. Laser system according to claim 4, wherein said coupling inductances are equivalent inductances, and wherein the electrical connection of said coupling inductances is established by mechanically connecting them to said plate sections.

12. Laser system according to claim 4, wherein said coupling inductances are connected to said plate sections by wire wrapping.

13. Laser system according to claim 4, wherein said plate sections are all of substantially equal size and said partings are all of substantially equal size.

14. Laser system according to claim 4, wherein at least some of said plate sections have different size surfaces.

15. Laser system according to claim 4, wherein at least some of said partings have different widths.

16. Laser system according to claim 4, wherein at least some of said coupling inductances have different L and R values.

17. TE-laser according to claim 4, wherein said second capacitor is in series connection with the parallel combination of the gap formed by the laser electrodes and a highly resistive impedance connected across the gap; said series connection being in parallel connection with said high-voltage source, and with said first capacitor.

18. TE-laser according to claim 17 wherein said equivalent inductances include inductances, part of which are created by forming at least one of said capacitor plates into a U-shape, wherein the "legs" of the "U" form the plate sections of adjacent capacitors and the bottom of the "U" forms said part of the equivalent inductance.

19. TE-laser according to claim 3 wherein said pulse-forming network is of the charge-transfer type in which at least one plate section of one of said first and second capacitors connected in common to one of said laser electrodes, is divided into n of said adjacent plate sections having n−1 partings disposed therebetween, said coupling inductances conductively connecting said plate sections to each other.

20. Laser system according to claim 19, wherein said plate sections have rectangular surfaces forming a rectangular capacitor stack.

21. Laser system according to claim 19, wherein said coupling inductances are in the form of small coils.

22. Laser system according to claim 19, wherein said coupling inductances are in the form of small filaments.

23. Laser system according to claim 19, wherein said plate sections have edges bordering on said partings and said coupling inductances are attached to said plate sections at discrete points distributed along said bordering edges of said plate sections.

24. Laser system according to claim 19, wherein said coupling inductances are intermetallically connected to said plate sections by soldering or brazing.

25. Laser system according to claim 19, wherein said coupling inductances are intermetallically connected to said plate sections by welding.

26. Laser system according to claim 19, wherein said coupling inductances are equivalent inductances, and wherein the electrical connection of said coupling inductances is established by mechanically connecting them to said plate sections.

27. Laser system according to claim 19, wherein said coupling inductances are connected to said plate sections by wire wrapping.

28. Laser system according to claim 19, wherein said plate sections are all of substantially equal size and said partings are all of substantially equal size.

29. Laser system according to claim 19, wherein at least some of said plate sections have different size surfaces.

30. Laser system according to claim 19, wherein at least some of said partings have different widths.

31. Laser system according to claim 19, wherein at least some of said coupling inductances have different L and R values.

32. TE-laser according to claim 3, wherein at least one of said capacitors is a stripline capacitor.

33. TE-laser according to claim 32, wherein said high-voltage source includes a plus and a minus terminal connected to each side, respectively, of said rapid high-voltage switch.

34. TE-laser according to claim 19, wherein said second capacitor is in parallel connection with the parallel circuit of the laser gap and a highly resistive impedance connected across the laser gap, and wherein said parallel circuit is in series connection with said first capacitor and with said high-voltage source.

35. TE-laser according to claim 34 wherein said equivalent coupling inductances include inductances, part of which are created by forming at least one of said capacitor plates into a U-shape, wherein the "legs" of the "U" form the plate sections of adjacent capacitors and the bottom of the "U" forms said part of the equivalent inductance.

36. TE-laser according to claim 32 wherein said dielectric layer includes water.

* * * * *